(12) United States Patent
Kluck

(10) Patent No.: US 9,410,605 B2
(45) Date of Patent: Aug. 9, 2016

(54) DIFFERENTIAL ASSEMBLY HAVING A LINK SHAFT

(71) Applicant: ArvinMeritor Technology, LLC, Troy, MI (US)

(72) Inventor: Robert D. Kluck, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 26 days.

(21) Appl. No.: 14/277,090

(22) Filed: May 14, 2014

(65) Prior Publication Data

US 2015/0330494 A1 Nov. 19, 2015

(51) Int. Cl.
  *F16H 48/38* (2012.01)
  *F16H 57/08* (2006.01)
  *F16H 48/08* (2006.01)

(52) U.S. Cl.
  CPC ............... *F16H 48/38* (2013.01); *F16H 48/08* (2013.01); *F16H 57/082* (2013.01); *F16H 2048/085* (2013.01); *F16H 2048/087* (2013.01)

(58) Field of Classification Search
  None
  See application file for complete search history.

(56) References Cited

U.S. PATENT DOCUMENTS

| | | | | |
|---|---|---|---|---|
| 6,045,479 | A * | 4/2000 | Victoria et al. | 475/230 |
| 7,291,083 | B2 * | 11/2007 | Almaguer | 475/221 |
| 7,695,392 | B2 * | 4/2010 | Isken et al. | 475/230 |
| 8,535,191 | B1 * | 9/2013 | Gall et al. | 475/160 |
| 2012/0149522 | A1 * | 6/2012 | Isken et al. | 475/231 |
| 2015/0059180 | A1 * | 3/2015 | Hirao | 29/893.2 |

FOREIGN PATENT DOCUMENTS

| | | |
|---|---|---|
| DE | 1065283 B | 9/1959 |
| GB | 152017 | 12/1921 |
| GB | 1252520 | 11/1971 |

OTHER PUBLICATIONS

United States Patent and Trademark Office, U.S. Appl. No. 14/012,477, filed Aug. 28, 2013.
European Patent Office, Extended European Search Report for the corresponding European Patent Application No. 15156567.8 mailed Sep. 11, 2015.

* cited by examiner

*Primary Examiner* — Justin Holmes
(74) *Attorney, Agent, or Firm* — Brooks Kushman P.C.

(57) ABSTRACT

A differential assembly having at least one link shaft that may be disposed in a case between a first gear and a second gear. The link shaft may have a bend portion that may not be coaxially disposed with first and second end portions of the link shaft. A pinion gear may engage the first and second gears may be rotatably disposed on the link shaft.

20 Claims, 4 Drawing Sheets

DIFFERENTIAL ASSEMBLY HAVING A LINK SHAFT

TECHNICAL FIELD

This patent application relates to a differential assembly having a link shaft.

BACKGROUND

A bevel gear differential is disclosed in U.S. patent application Ser. No. 14/012,477.

SUMMARY

In at least one embodiment, a differential assembly is provided. The differential assembly may include a case, a first gear, a second gear, a link shaft, and a pinion gear. The first and second gears may be disposed proximate the case and may be configured to rotate about an axis. The link shaft may be disposed between the first gear and the second gear. The link shaft may include a first end portion, a second end portion, and a bend portion. The first end portion may extend along a link shaft axis and may be fixedly positioned with respect to the case. The second end portion may be coaxially disposed with the first end portion. The bend portion may extend from the first end portion to the second end portion. The bend portion may intersect the axis and may not be coaxially disposed with the first end portion and the second end portion. The pinion gear may be rotatably disposed on the link shaft and may engage the first gear and the second gear.

In at least one embodiment, a differential assembly is provided. The differential assembly may include a case, a first gear, a second gear, a first link shaft, a second link shaft, a first pinion gear, and a second pinion gear. The first and second gears may be disposed in the case. The first link shaft may be disposed proximate the case and may be disposed between the first gear and the second gear. The second link shaft may be disposed proximate the case and may be disposed between the first link shaft and the second gear. The first pinion gear may be rotatably disposed on the first link shaft and may engage the first gear and the second gear. The second pinion gear may be rotatably disposed on the second link shaft and may engage the first gear and the second gear.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
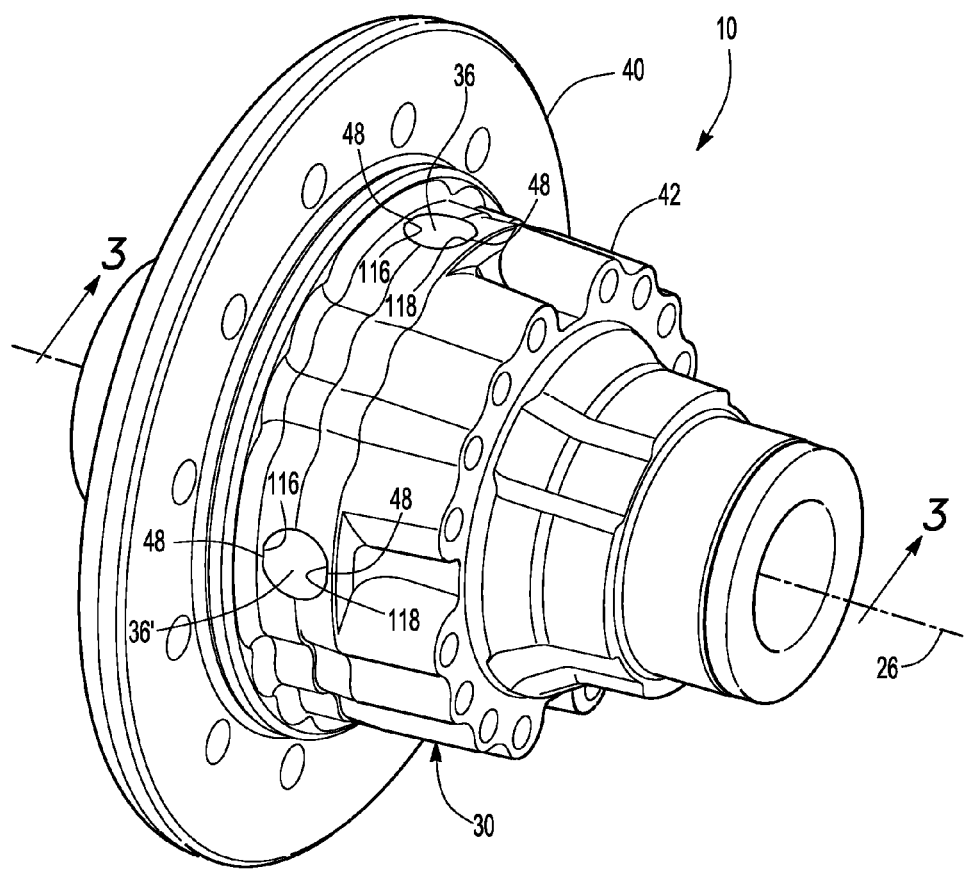
FIG. 1 is a perspective view of a differential assembly.
Figure 2:
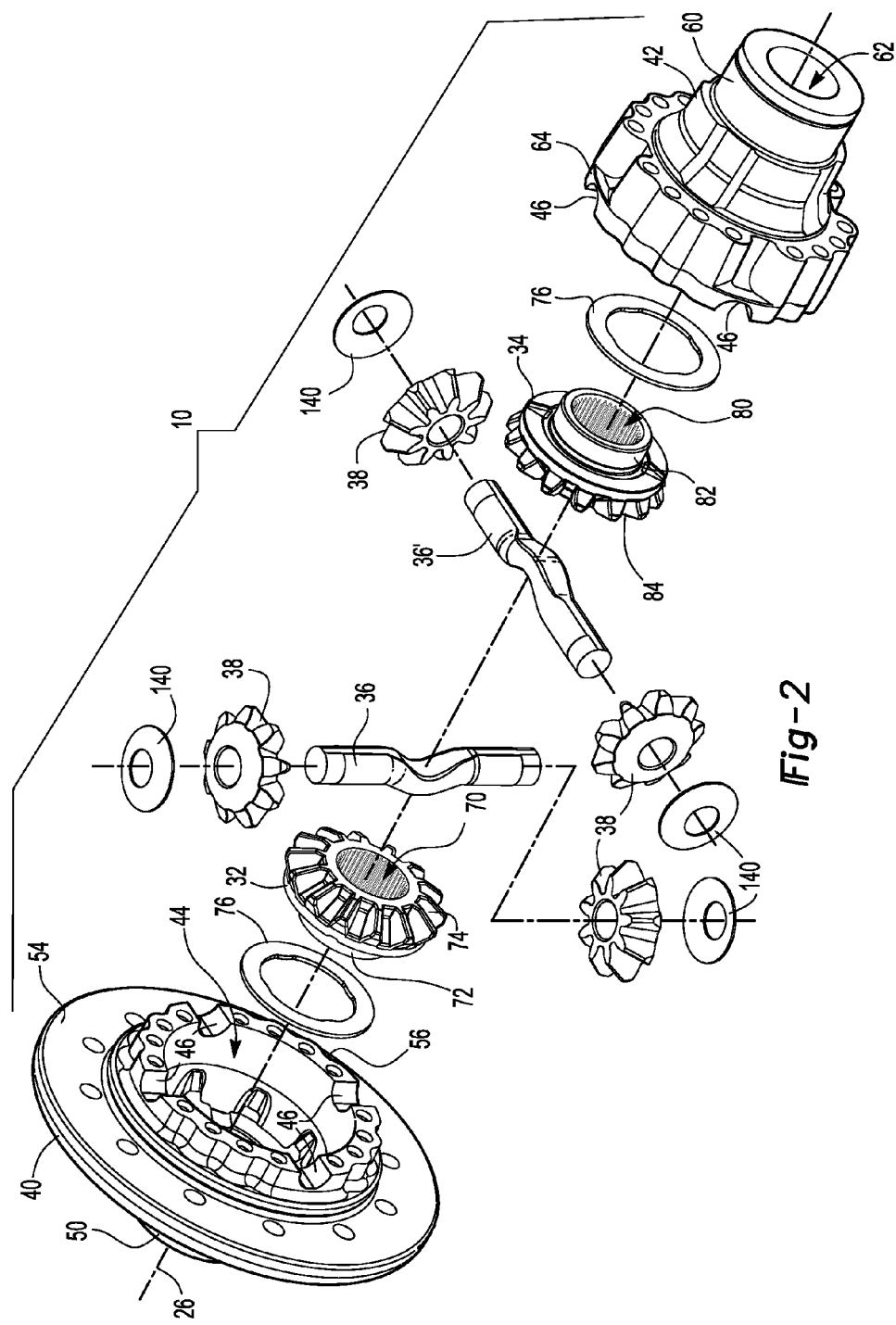
FIG. 2 is an exploded view of the differential assembly.
Figure 3:
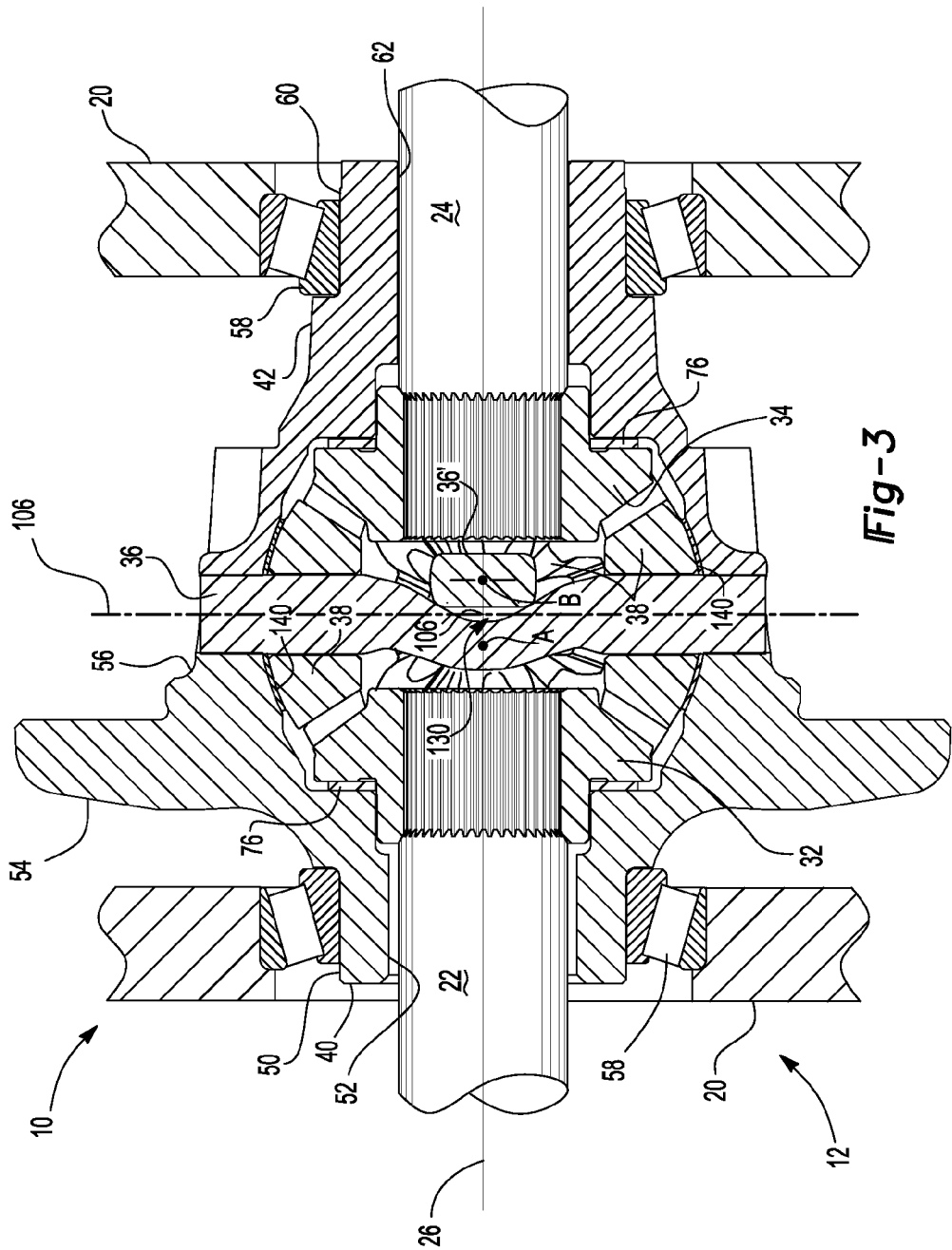
FIG. 3 is a section view of the differential assembly along section line 3-3.

Referring to FIGS. 1-3, an exemplary differential assembly 10 is shown. The differential assembly 10 may be configured for use with a vehicle, such as a motor vehicle like a truck, bus, farm equipment, military transport or weaponry vehicle, or cargo loading equipment for land, air, or marine vessels.

The differential assembly 10 may be provided with a vehicle drivetrain component or assembly, such as an axle assembly, transfer case, or wheel hub assembly. For example, the differential assembly 10 may be provided with a transfer case or may be configured as an interaxle differential unit that may be provided with an axle assembly to compensate for speed differences between different axle assemblies. The differential assembly 10 may also be provided with a wheel hub assembly that may rotatably support a vehicle wheel to provide gear reduction or gear ratio modification between a wheel axle and a traction wheel. The differential assembly 10 is described below primarily in the context of an axle assembly 12 and more specifically as a differential assembly 10 that may transmit torque to wheel axles and traction wheel assemblies and permit the wheel axles and fraction wheel assemblies to rotate at different velocities.

Referring to FIG. 3, the axle assembly 12 may include a housing 20, a first shaft 22, and a second shaft 24.

The housing 20 may receive the differential assembly 10 and various components of the axle assembly 12. In addition, the housing 20 may facilitate mounting of the axle assembly 12 to the vehicle. In FIG. 3, only a portion of the housing 20 is shown to more clearly illustrate the differential assembly 10.

The first shaft 22 and the second shaft 24 may be at least partially disposed in the housing 20. In addition, the first shaft 22 and the second shaft 24 may be spaced apart from each other and may extend in opposite directions from the differential assembly 10. The first shaft 22 and the second shaft 24 may be configured to rotate about an axis 26. For instance, the first shaft 22 and the second shaft 24 may rotate independently or at different speeds about the axis 26 due to operation of the differential assembly 10. In at least one embodiment, the first shaft 22 and the second shaft 24 may each be connected to or may be configured as wheel axle that may be connected to a wheel assembly. As such, the first shaft 22 and the second shaft 24 may be rotated about the axis 26 by the differential assembly 10 to provide torque to a corresponding wheel assembly. Alternatively, the first shaft 22 may be configured as an input shaft that may receive an input torque and the second shaft 24 may be configured as an output shaft that may provide torque to another component. For instance, the first shaft 22 may receive an input torque and the second shaft 24 may provide torque to another component, such as another axle assembly when configured as an interaxle differential unit. Similarly, the first shaft 22 may receive an input torque from a wheel axle and the second shaft 24 may provide torque to a wheel assembly when provided with a wheel hub assembly.

Referring to FIGS. 1-3, the differential assembly 10 may facilitate the transfer of torque between components and/or allow components to rotate at different velocities. In at least one embodiment, the differential assembly 10 may include a case 30, a first gear 32, a second gear 34, at least one link shaft 36, and at least one pinion gear 38.

The case 30 may be configured to receive components of the differential assembly 10. In at least one embodiment, the case 30 may include a first case portion 40 and a second case portion 42 that may cooperate to at least partially define a cavity 44. The cavity 44 may at least partially receive the first gear 32, second gear 34, link shaft(s) 36, and pinion gear(s) 38. The first case portion 40 and the second case portion 42 may also cooperate to define a set of link shaft openings 46 that may receive and help secure a link shaft 36. In at least one embodiment, one or more link shaft openings 46 may include a flat 48 that may help inhibit rotation of a link shaft 36 that is received in the link shaft opening 46 as will be discussed in more detail below.

Referring to FIGS. 2 and 3, an example of a first case portion 40 is shown. The first case portion 40 may include a bearing surface 50, a first hole 52, a flange portion 54, and a first mounting portion 56.

The bearing surface 50 may extend around the axis 26 and may extend around the first hole 52. The bearing surface 50 may be disposed proximate and may engage a bearing 58 that may rotatably support the first case portion 40. The bearing 58 may be mounted on another component, such as the housing 20.

The first hole 52 may be disposed along the axis 26. The first hole 52 may be configured to receive the first shaft 22 and/or the first gear 32. For example, the first hole 52 may be provided with a stepped configuration that may help position and inhibit axial movement of the first gear 32 away from the second gear 34.

The flange portion 54 may extend outwardly and further away from the axis 26 than the bearing surface 50. A ring gear may be mounted to the flange portion 54 when the differential assembly 10 is provided in an axle assembly 12 in which the first shaft 22 and second shaft 24 transmit torque to wheel axles and traction wheel assemblies. The flange portion 54 may have one or more fastener holes that may receive corresponding fasteners that couple the ring gear to the flange portion 54. The ring gear may engage a pinion and receive torque from a pinion that may receive torque from a drivetrain component, such as an internal combustion engine, transmission, or transfer case. Torque provided to the pinion may be transmitted to the ring gear and then to corresponding wheel end assemblies and traction wheels via the first shaft 22 and the second shaft 24. Alternatively, the ring gear may be omitted in various configurations, such as when the differential assembly is configured as an interaxle differential unit. In an interaxle differential unit, gear teeth may be provided with the case 30 to facilitate locking of the interaxle differential unit, the first shaft 22 may be an input shaft, and the second shaft 24 may be an output shaft that may provide torque to another axle assembly.

The first mounting portion 56 may face toward and may engage the second case portion 42. The first mounting portion 56 may include one or more fastener holes that may receive corresponding fasteners that may couple the second case portion 42 to the first case portion 40. In at least one embodiment, the first mounting portion 56 may extend around and at least partially define the cavity 44. Members of the set of link shaft openings 46 may be at least partially defined by the first mounting portion 56.

The second case portion 42 may be mounted to and may not rotate with respect to the first case portion 40. In at least one embodiment, the second case portion 42 may include a bearing surface 60, a second hole 62, and a second mounting portion 64.

The bearing surface 60 may extend around the axis 26 and may extend around the second hole 62. The bearing surface 60 may be disposed proximate and may engage a bearing 58 that may rotatably support the second case portion 42. The bearing 58 may be mounted on another component, such as the housing 20.

The second hole 62 may be disposed along the axis 26. The second hole 62 may be configured to receive the second shaft 24 and/or the second gear 34. For example, the second hole 62 may be provided with a stepped configuration that may help position and inhibit axial movement of the second gear 34 away from the first gear 32.

The second mounting portion 64 may face toward and may engage the first case portion 40. The second mounting portion 64 may include one or more fastener holes that may receive corresponding fasteners that may couple the second case portion 42 to the first case portion 40. Members of the set of link shaft openings 46 may be at least partially defined by the second mounting portion 64.

The first gear 32 may be disposed proximate the first case portion 40. The first gear 32 may be attached to or may be integral with the first case portion 40 or may be a detached separate component. The first gear 32 may be disposed proximate the first hole 52 or may be at least partially disposed in the first hole 52. In at least one embodiment, the first gear 32 may include a first gear hole 70, an outer surface 72, and a gear portion 74.

The first gear hole 70 may be disposed along the axis 26. The first gear hole 70 may be configured to receive the first shaft 22. The first gear 32 may rotate with the first shaft 22. For example, the first gear hole 70 may have a spline that may mate with a corresponding spline on the first shaft 22 such that the first gear 32 may not rotate with respect to the first shaft 22.

The outer surface 72 may extend around the axis 26 and around the first gear hole 70. The outer surface 82 may be disposed proximate and may engage a surface of the first case portion 40.

The gear portion 74 may face toward and may be spaced apart from the link shaft 36. The gear portion 74 may have a set of teeth that may be arranged around the axis 26 and that may mate with one or more pinion gears 38.

The second gear 34 may be disposed proximate the second case portion 42. The second gear 34 may be disposed proximate the second hole 62 or may be at least partially disposed in the second hole 62. The second gear 34 may be spaced apart from the first gear 32 and may have a similar or identical configuration as the first gear 32. In at least one embodiment, the second gear 34 may include a second gear hole 80, an outer surface 82, and a gear portion 84.

The second gear hole 80 may be disposed along the axis 26. The second gear hole 80 may be configured to receive the second shaft 24. In at least one embodiment, the second gear 34 may rotate with the second shaft 24. For example, the second gear hole 80 may have a spline that may mate with a corresponding spline on the second shaft 24 such that the second gear 34 may not rotate with respect to the second shaft 24.

The outer surface 82 may extend around the axis 26 and around the second gear hole 80. The outer surface 82 may be disposed proximate and may engage a surface of the second case portion 42.

The gear portion 84 may face toward and may be spaced apart from the link shaft 36. The gear portion 84 may have a set of teeth that may be arranged around the axis 26 and that may mate with one or more pinion gears 38.

At least one link shaft 36 may be provided to rotatably support one or more pinion gears 38. In FIG. 2, two link shafts 36 are shown, although it is contemplated that a greater or lesser number of link shafts may be provided. The link shafts 36 may or may not have the same configuration. The link shaft disposed closest to the first gear 32 may be referred to as a first link shaft 36 while the link shaft disposed closest to the second gear 34 may be referred to as a second link shaft 36'. The designation of the second link shaft 36' with a different reference number is for clarity and may not imply that the second link shaft 36' has a different configuration that the first link shaft 36 in one or more embodiments. The first link shaft 36 may be disposed between the first gear 32 and the second link shaft 36'. The second link shaft 36' may be disposed between the first link shaft 36 and the second gear 34.

Figure 5:
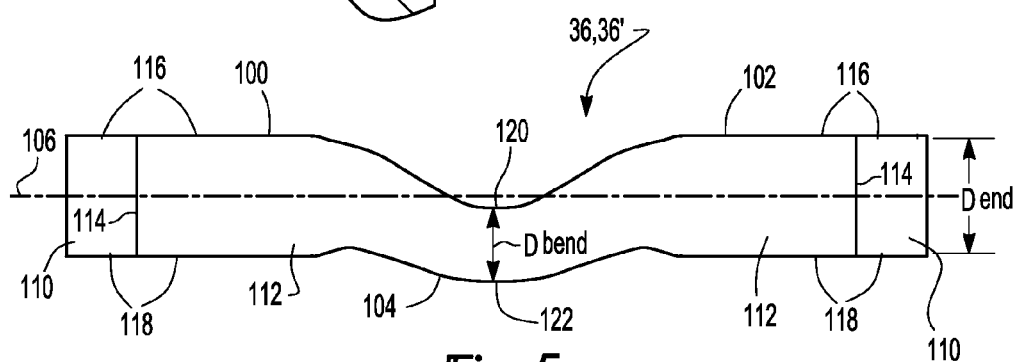
FIGS. 5 and 6 are side views of a link shaft.
Figure 6:
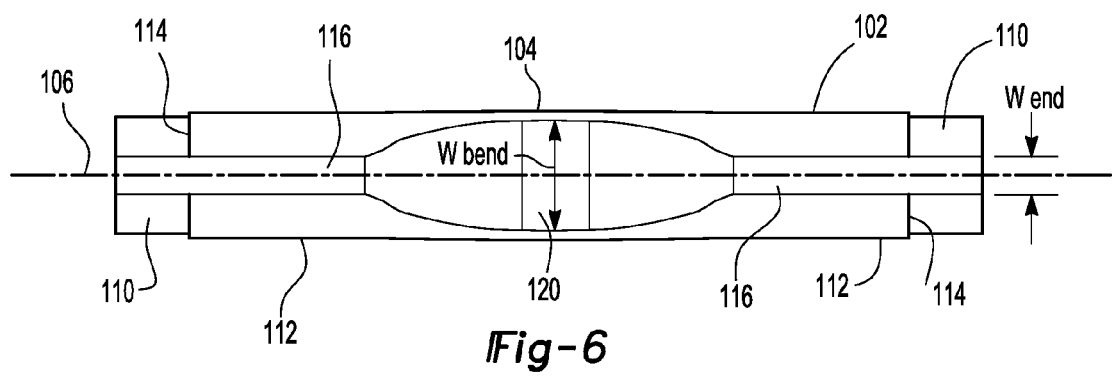

Each link shaft 36, 36' may have a non-linear configuration that may allow the link shafts 36, 36' to bend around each other near the axis 26. As such, the first link shaft 36 and the second link shaft 36' may intersect the axis 26 at different axial locations. For instance, the first link shaft 36 may intersect the axis 26 at an axial location that is closer to the first gear 32 than where the second link shaft 36' intersects the axis 26. As is best shown in FIGS. 5 and 6, the link shaft 36. 36' may include a first end portion 100, a second end portion 102, and a bend portion 104.

The first end portion 100 may be disposed proximate a first end of the link shaft 36. The first end portion 100 may extend along or may be centered about a link shaft axis 106, which may also be referred to as a first link shaft axis with reference to the first link shaft 36. The link shaft axis 106 may be disposed substantially perpendicular to the axis 26. The first end portion 100 may be at least partially received in a link shaft opening 46 of the case 30. In addition, the first end portion 100 may be fixedly positioned with respect to the case 30. The first end portion 100 may have a generally cylindrical configuration or may have a stepped configuration or may include one or more flats. In at least one embodiment, the first end portion 100 may include a first outer surface 110, a second outer surface 112, a step surface 114, and a first end portion flat 116.

The first outer surface 110 may be received in the link shaft opening 46. The first outer surface 110 may be a circumferential surface that may be disposed radially about the link shaft axis 106.

The second outer surface 112 may be disposed outside the link shaft opening 46. The second outer surface 112 may be a circumferential surface that may be disposed radially about the link shaft axis 106. The second outer surface 112 may be larger or have a larger diameter than the first outer surface 110 and the link shaft opening 46.

The step surface 114 may extend from the first outer surface 110 to the second outer surface 112. The step surface 114 may also be substantially perpendicular to the axis 26 in one or more embodiments. The step surface 114 may engage the case 30 to inhibit axial movement of the link shaft 36 or movement of the link shaft 36, 36' along the link shaft axis 106.

The first end portion flat 116 may be provided with the first outer surface 110 and/or the second outer surface 112. The first end portion flat 116 may be generally planar and may be extend from an end surface of the link shaft 36, 36' and may be spaced apart from the axis 26. The first end portion flat 116 may engage or mate with the flat 48 of the link shaft opening 46 to help inhibit rotation of the link shaft 36, 36' about the link shaft axis 106 as is best shown in FIG. 1. For example, the first end portion flat 116 may appear as a chord or secant line that intersects the first outer surface 110 at two points when viewed from the end of the link shaft 36, 36'. The first end portion flat 116 may end at the step surface 114 or may extend along the second outer surface 112 in one or more embodiments.

As is shown in FIGS. 1 and 5, the link shaft 36, 36' may optionally include a second end portion flat 118 that may be disposed opposite the first end portion flat 116. The second end portion flat 118 may have similar attributes as the first end portion flat 116.

Referring to FIGS. 5 and 6, the second end portion 102 may be disposed opposite the first end portion 100. As such, the first end portion 100 and the second end portion 102 may extend from opposite ends of the bend portion 104. The second end portion 102 may be disposed in a different link shaft opening 46 than the first end portion 100. In addition, the second end portion 102 may be coaxially disposed with the first end portion 100. The second end portion 102 may have the same attributes as the first end portion 100, such as a first outer surface 110, a second outer surface 112, a step surface 114, a first end portion flat 116, and second end portion flat 118. As such, common reference numbers are used to designate these features.

The bend portion 104 may be disposed between and may extend from the first end portion 100 to the second end portion 102. As is best shown in FIGS. 2 and 3, the bend portion 104 may intersect by the axis 26 but may be offset from or completely spaced apart from the link shaft axis 106 proximate the axis 26 as is best shown in FIGS. 5 and 6. Accordingly, the bend portion 104 may not be coaxially disposed with the first end portion 100, the second end portion 102, and/or the link shaft axis 106. Moreover, the link shaft 36, 36' and the bend portion 104 may intersect the axis 26 at a location that is offset from the link shaft axis 106 as is best shown in FIG. 3.

Referring to FIGS. 5 and 6, the bend portion 104 may include a first bend portion flat 120 that may be offset from the link shaft axis 106. The first bend portion flat 120 may be substantially parallel to the first end portion flat 116 and may be offset from or spaced apart from the link shaft axis 106. The first bend portion flat 120 may have a greater width $W_{Bend}$ than the width $W_{End}$ of the first end portion flat 116. As such, the first bend portion flat 120 may help inhibit rotation of one link shaft 36, 36' with respect to another link shaft 36', 36 and/or may provide greater surface area proximate the axis 26 to help distribute and withstand load forces exerted from the other link shaft.

The bend portion 104 may have an optional second bend portion flat 122 that may be disposed opposite the first bend portion flat 120. The second bend portion flat 122 may be substantially parallel to the first bend portion flat 120. A distance $D_{Bend}$ from the first bend portion flat 120 to the second bend portion flat 122 may be less than a distance $D_{End}$ from the first end portion flat 116 to the second end portion flat 118. As such, the bend portion 104 may be thinner than the first and second end portions 100, 102 to help reduce package space.

Referring to FIGS. 2 and 3, the second link shaft 36' may have the same or a similar configuration as the first link shaft 36. In addition, the second link shaft 36' may be disposed substantially perpendicular to the first link shaft 36 in one more embodiments. The second link shaft 36' may extend along a second link shaft axis, which is referenced with reference number 106' for clarity when being compared with or discussed with the first link shaft axis 10 of the first link shaft 36. The second link shaft axis 106' may be disposed substantially perpendicular to the first link shaft axis 106. Moreover, the bend portion 104 of the first link shaft 36 may be disposed closer to the first gear 32 than the bend portion 104 of the second link shaft 36' while the bend portion 104 of the second link shaft 36' may be disposed closer to the second gear 34 than the bend portion 104 of the first link shaft 36. As such, the bend portions 104 or center of the bend portions 104 may intersect the axis 26 at different points. For example, the center of the bend portion 104 of the first link shaft 36 may intersect the axis 26 at point A while the center of the bend portion 104 of the second link shaft 36' may intersect the axis 26 at point B.

The bend portion 104 of the first link shaft 36 may be disposed proximate and may engage the bend portion 104 of the second link shaft 36'. Moreover, the bend portion 104 of the first link shaft 36 and the bend portion 104 of the second link shaft 36' may engage in different manners. In FIG. 3, the first link shaft 36 and the second link shaft 36' are show with substantially identical configurations. As such, the first link shaft 36 may engage the second link shaft 36' along a pair of edge surfaces, but the bend portion 104 of the first link shaft 36 may be spaced apart from the bend portion 104 of the second link shaft 36' proximate the axis 26, as is represented by the gap 130 between the bend portion 104 of the first link shaft 36 and the bend portion 104 of the second link shaft 36'.

Figure 4:
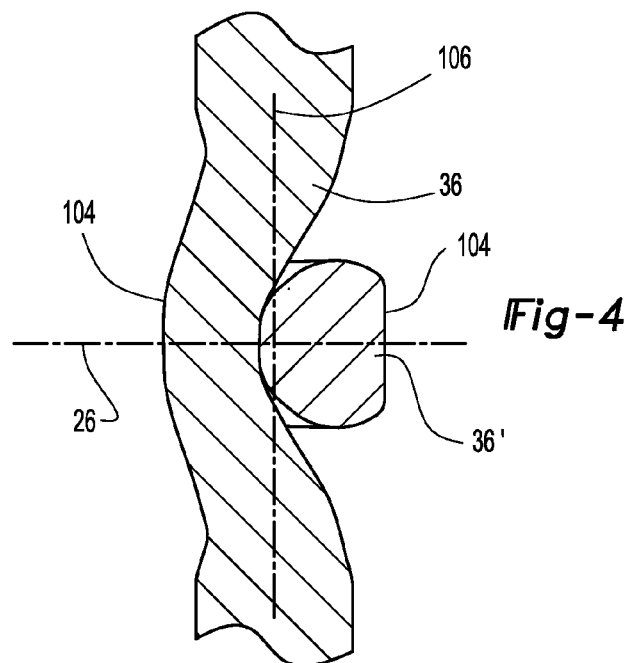
FIG. 4 is a section view of a portion of the differential assembly illustrating another link shaft configuration.

Referring to FIG. 4, another link shaft configuration is shown. In this configuration, one link shaft 36" may be provided with additional material such that no gap may be provided between opposing surfaces of the first link shaft 36 and the second link shaft 36". As such, the bend portion 104 of the first link shaft 36 may be in continuous engagement with the bend portion 104 of the second link shaft 36" at the axis 26 and where the bend portion 104 of the first link shaft 36 is disposed directly opposite the bend portion 104 of the second link shaft 36". Such a configuration may help better distribute load forces between the first link shaft 36 and the second link shaft 36" as compared to the configuration shown in FIG. 3. The second link shaft 36" may otherwise have the same or similar attributes as link shaft 36 or 36'. Moreover, it is to be understood that the link shafts 36, 36' are shown without the other components of the differential assembly 10 for clarity. As such, the differential assembly of FIG. 3 may be provided with the link shaft configuration shown in FIG. 4.

Referring to FIGS. 2-4, a pinion gear 38 may be rotatably disposed on an end portion of a link shaft 36, 36', 36". For instance, a pinion gear 38 may have a hole that may receive the first end portion 100 or the second end portion 102. Optionally, a set of roller bearings may be disposed between the pinion gear 38 and the link shaft 36, 36', 36" to facilitate rotation of a pinion gear 38. Multiple pinion gears 38 may be referred to collectively as a set of pinion gears 38. In the embodiment shown, four pinion gears 38 are provided such that a pinion gear 38 is rotatably disposed on each end portion of each link shaft 36, 36', 36", although it is contemplated that one or more of the pinion gears 38 may be omitted in one or more embodiments. In FIGS. 2-4, two pinion gears 38 may rotate about the first link shaft 36 and the first link shaft axis 106 and two pinion gears 38 may rotate about the second link shaft 36' or 36" and the second link shaft axis 106'. A pinion gear 38 may have a set of teeth that mate with teeth of the gear portion 74 of the first gear 32 and teeth of the gear portion 84 of the second gear 34. A thrust washer 140 may extend around the link shaft 36, 36', 36" and may be disposed between the case 30 and the pinion gear 38 to help position and/or retain the pinion gear 38.

The differential assembly described above may be provided without a spider that may have multiple pins that may extend from a central hub to support pinion gears. As such, the link shafts may replace a differential spider. Moreover, the link shafts may be less expensive to manufacture and may be more durable than a spider, which may improve performance and product life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential assembly comprising:
    a case;
    first and second gears disposed proximate the case and configured to rotate about an axis;
    a link shaft that is disposed between the first gear and the second gear, the link shaft including:
        a first end portion that extends along a link shaft axis and is fixedly positioned with respect to the case, wherein the first end portion has a first end portion flat,
        a second end portion that is coaxially disposed with the first end portion, and
        a bend portion that extends from the first end portion to the second end portion, wherein the bend portion intersects the axis and is not coaxially disposed with the first end portion and the second end portion, wherein the first end portion flat extends from an end surface of the link shaft to the bend portion; and
    a pinion gear that is rotatably disposed on the link shaft and that engages the first gear and the second gear.

2. The differential assembly of claim 1 wherein the link shaft intersects the axis at a location that is offset from the link shaft axis.

3. The differential assembly of claim 1 wherein the case has first and second link shaft openings and the first end portion and the second end portion are received in the first and second link shaft openings, respectively.

4. The differential assembly of claim 3 wherein the case further comprises a first case portion that receives the first gear and a second case portion that receives the second gear, wherein the first case portion and the second case portion cooperate to define the first and second link shaft openings.

5. The differential assembly of claim 3 wherein the first end portion further comprises a first outer surface, a second outer surface that is disposed further from the link shaft axis than the first outer surface, and a step surface that extends from the first outer surface to the second outer surface, wherein the first outer surface is disposed in the first link shaft opening and the step surface inhibits axial movement of the link shaft with respect to the case.

6. The differential assembly of claim 5 wherein the first link shaft opening has a first flat and the first end portion flat is disposed proximate the first outer surface and engages the first flat to inhibit rotation of the link shaft.

7. The differential assembly of claim 6 wherein the bend portion further comprises a first bend portion flat that is substantially parallel to the first end portion flat.

8. The differential assembly of claim 7 wherein the first bend portion flat is offset from the link shaft axis.

9. The differential assembly of claim 7 wherein the first bend portion flat has a greater width than the first end portion flat.

10. The differential assembly of claim 7 wherein the first end portion further comprises a second end portion flat disposed opposite the first end portion flat, and a second bend portion flat disposed opposite the first bend portion flat, wherein a distance from the first end portion flat to the second end portion flat is greater than a distance from the first bend portion flat to the second bend portion flat.

11. A differential assembly comprising:
    a case;
    a first gear that is disposed in the case and is configured to rotate about an axis;
    a second gear that is spaced apart from the first gear and is disposed in the case;

a first link shaft that is disposed proximate the case and disposed between the first gear and the second gear, wherein the first link shaft has a first end portion and a second end portion that are centered about a first link shaft axis and a first bend portion that extends from the first end portion to the second end portion and that has a first bend portion flat that is offset from the first link shaft axis such that the first link shaft axis does not intersect the first link shaft where the first link shaft axis intersects the axis;

a second link shaft that is disposed proximate the case and is disposed between the first link shaft and the second gear;

a first pinion gear that is rotatably disposed on the first link shaft and that engages the first gear and the second gear; and a second pinion gear that is rotatably disposed on the second link shaft and that engages the first gear and the second gear.

12. The differential assembly of claim 11 wherein the first link shaft is disposed substantially perpendicular to the second link shaft.

13. The differential assembly of claim 11 wherein the first gear and the second gear are configured to rotate about the axis and wherein the first link shaft and the second link shaft intersect the axis at different locations.

14. The differential assembly of claim 13 wherein the first link shaft engages the second link shaft but is spaced apart from the second link shaft along the axis.

15. The differential assembly of claim 11 wherein the first bend portion is disposed closer to the first gear than the second gear and the second link shaft further comprises a second bend portion that is disposed proximate the first bend portion.

16. The differential assembly of claim 15 wherein the second bend portion is disposed closer to the second gear than the first gear.

17. The differential assembly of claim 16 wherein the first bend portion engages the second bend portion.

18. The differential assembly of claim 15 wherein the first gear and the second gear rotate about the axis, and wherein the first bend portion engages the second bend portion along the axis.

19. The differential assembly of claim 15 wherein the first pinion gear is disposed between the first bend portion and the case.

20. The differential assembly of claim 15 wherein the second pinion gear is disposed between the second bend portion and the case.

* * * * *